(12) United States Patent
Rodrigues et al.

(10) Patent No.: US 7,805,905 B2
(45) Date of Patent: Oct. 5, 2010

(54) ROOFING SHINGLE

(75) Inventors: Tommy Rodrigues, Union, NJ (US); Frederick W. Sieling, Bound Brook, NJ (US); Awdhoot Vasant Kerkar, Rockaway, NJ (US); Atilla Sebuktekin, Wayne, NJ (US)

(73) Assignee: Building Materials Investment Corporation, Dallas, TX (US)

( * ) Notice: Subject to any disclaimer, the term of this patent is extended or adjusted under 35 U.S.C. 154(b) by 343 days.

(21) Appl. No.: 10/777,950

(22) Filed: Feb. 12, 2004

(65) Prior Publication Data

US 2005/0193673 A1 Sep. 8, 2005

(51) Int. Cl.
*E04D 1/00* (2006.01)

(52) U.S. Cl. .............. 52/557; 52/314; 52/554; D25/139

(58) Field of Classification Search .......... 52/557, 52/558, 559, 554, 105, 555, 314, 518, 543; 83/920; D25/139
See application file for complete search history.

(56) References Cited

U.S. PATENT DOCUMENTS

| | | | |
|---|---|---|---|
| 4,541,217 A | 9/1985 | Stewart | |
| D313,278 S | 12/1990 | Noone | |
| D313,658 S | 1/1991 | Noone | |
| 5,181,361 A | 1/1993 | Hannah | |
| 5,209,802 A | 5/1993 | Hannah | |
| D336,347 S * | 6/1993 | Hannah et al. | D25/139 |
| D340,294 S | 10/1993 | Hannah | |
| 5,287,669 A | 2/1994 | Hannah | |
| D350,615 S | 9/1994 | Klein et al. | |
| 5,347,785 A | 9/1994 | Terrenzio | |
| 5,375,387 A | 12/1994 | Davenport | |
| 5,375,491 A | 12/1994 | Hannah | |
| 5,426,902 A | 6/1995 | Stahl | |
| D366,124 S | 1/1996 | Hannah | |
| D366,335 S | 1/1996 | Noone | |
| 5,488,807 A | 2/1996 | Terrenzio | |
| D375,563 S * | 11/1996 | Hannah et al. | D25/139 |
| D376,660 S | 12/1996 | Hannah | |
| 5,660,014 A | 8/1997 | Stahl | |
| D388,195 S | 12/1997 | Hannah | |
| 5,901,517 A | 5/1999 | Stahl | |
| 6,038,827 A | 3/2000 | Sieling | |
| 6,058,670 A * | 5/2000 | Sieling et al. | 52/554 |
| 6,092,345 A | 7/2000 | Kalkanoglu | |
| 6,105,329 A * | 8/2000 | Bondoc et al. | 52/557 |

(Continued)

OTHER PUBLICATIONS

Visual Aid prepared by Applicant Discussed in Interview of Feb. 9, 2009—3 pages.

*Primary Examiner*—Richard E Chilcot, Jr.
*Assistant Examiner*—William V Gilbert
(74) *Attorney, Agent, or Firm*—William J. Davis; Sills Cummis & Gross

(57) ABSTRACT

The present invention provides a roof shingle comprising a shingle with at least one layer having a head lap and a butt, the head lap including at least one alignment notch and the butt including at least one corner that corresponds to the alignment notch. Also, the present invention provides a roofing shingle comprising at least one layer formed from a cutting cylinder having a circumference that is a fraction of said roofing shingle length. The present invention also provides a method for manufacturing the inventive shingles and a method for installing the inventive shingles upon a roofing area.

7 Claims, 8 Drawing Sheets

U.S. PATENT DOCUMENTS

| | | |
|---|---|---|
| 6,195,951 B1 | 3/2001 | Stahl |
| 6,212,843 B1 | 4/2001 | Kalkanoglu |
| 6,305,138 B1 * | 10/2001 | Stahl et al. .................... 52/314 |
| 6,401,425 B1 | 6/2002 | Frame |
| 6,421,976 B1 * | 7/2002 | Elliott et al. .................. 52/555 |
| 6,457,290 B1 | 10/2002 | Elliott |
| 6,467,235 B2 | 10/2002 | Kalkanoglu |
| 6,523,316 B2 | 2/2003 | Stahl |
| 6,546,688 B1 | 4/2003 | Parsons |
| 6,578,336 B2 | 6/2003 | Elliott |
| 6,679,020 B2 | 1/2004 | Becker |
| 2007/0017330 A1 | 1/2007 | Freshwater et al. |

\* cited by examiner

ROOFING SHINGLE

FIELD OF THE INVENTION

This invention relates to a roofing shingle having the bulk and configuration of more expensive roofing shingles. The inventive roofing shingle has the appearance of thicker shingles and has excellent fire resistance and protections against weathering, while retaining the substantially reduced cost of conventional asphalt shingles.

BACKGROUND OF THE INVENTION

Roofing shingles comprising felt of fabric stock impregnated with asphalt and covered with weather resistant mineral granules are well known, heretofore such shingles have served as relatively inexpensive alternatives to tile, slate and wood roofing shingles.

Roofing shingles have been utilized in many forms with rectangular, hexagonal, square and irregular tabs and tab recesses; providing a flat appearance that does not resemble more expensive and aesthetically pleasing roof coverings such as slate or tile. Even when tabs of distinguishing hue are employed, the shingle does not achieve the tonal affects inherent in natural slate shingles.

Manufacturers of asphalt shingles have long recognized the above problems and have sought to improve the appearance of asphalt shingles by various means including, for example, the use of many colors and variations in the configuration or elevation of the tabs. Attempts have also been made to produce irregular surface contours, which would give the shingle a bulkier appearance.

In an attempt to provide dimensional variation through shading, three layer composite shingles having mixed color tabs with shadow outlined backer strips have been produced; however, the cost of producing the three layer composite shingles, together with the expense of shipping and installing these heavier shingles, is high.

Accordingly, asphalt shingles heretofore available are at a competitive disadvantage with the more expensive roofing shingles because such shingles lack a bulky edge profile, surface contour and color blends which are characteristic of slate and wood shingles.

Accordingly, it is an object of this invention to provide a relatively inexpensive roofing shingle that has the appearance of thicker more expensive shingles, which have eluded those skilled in the art. Another object of the present invention is to provide roofing, which is both aesthetically pleasing and resistant to weathering. Yet another object of the present invention is to provide a shingle, which facilitates installation on a roof. These and other objects of the invention will become apparent from the following description and disclosure.

SUMMARY OF THE INVENTION

One embodiment of this invention pertains to a two-layer composite, asphalt impregnated shingle having superior weather resistance and an aesthetic appearance, which closely simulates a variable thickness slate surface.

In broad terms, the present invention is a laminated two-layer composite roofing shingle comprising:
 a posterior layer having a posterior headlap and a plurality of posterior tabs; and
 an anterior layer, positioned on the posterior layer, having an anterior headlap including at least one alignment notch and at least one anterior tab extending from the anterior headlap, where at least one anterior tab is positioned located on the plurality of posterior tabs.

The posterior layer may comprise a plurality of tabs extending from a posterior headlap. The bottom tab edges of posterior layer may be curved or straight and the tab corners can be cropped or can be formed by right, obtuse or acute angles. The posterior layer tabs have a granular surface in which the granules contribute to the coloring of the roof. The butt edge of the posterior layer tabs may include a shadow tip, which is formed using granules having a contrasting shade to the coloring granules covering the majority of the posterior tabs. The posterior layer may also include a shadow band positioned across the length of the posterior layer sheet, where the shadow band is positioned at an interface between the posterior headlap section and the posterior tabs.

The anterior layer may comprise of an anterior layer headlap including alignment notched regions and at least one anterior tab. The tabs of the anterior layer include colored granules that also contribute to the coloring of the roof. The alignment notched regions may be present in the regions of the anterior headlap, which do not include anterior tab regions. The breadth of the tabs of the anterior layer may be narrower than the breadth of the tabs of the posterior layer. The number of tabs in the anterior layer is generally less than the number of tabs in the posterior layer.

Joining the anterior layer and posterior layer forms the composite shingle. The anterior layer is positioned on the posterior layer. Generally, the butt of the posterior layer extends past the butt of the anterior layer and the head region of the anterior region extends past the head region of the posterior layer.

In another example of the present invention, the laminated two-layer composite roofing shingle may comprise:
 a posterior layer having a posterior headlap and a plurality of posterior tabs; and
 an anterior layer formed from a cutting cylinder having a circumference that is a fraction of the two-layer composite roofing shingle length, positioned on said posterior layer, having an anterior headlap including at least one alignment notch and at least one anterior tab extending from said anterior headlap, said at least one anterior tab is positioned on said plurality of posterior tabs.

Another aspect of the present invention is a method of manufacturing the above-described two-layer composite shingle. In broad terms, the inventive method comprises:
 applying colored granules to an asphalt coated sheet;
 cutting the asphalt coated sheet by rotating a cutting cylinder to produce an anterior layer, wherein the cutting cylinder circumference is a fraction of the two layer composite shingle length and wherein rotating the cutting cylinder produces a substantially repeating pattern in the anterior layer;
 cutting the asphalt coated sheet by rotating a second cutting cylinder to produce a posterior layer; and
 joining the anterior layer to the posterior layer to form the two-layer composite shingle.

Another aspect of the present invention is a method for installing the above described two-layer composite shingle to a roofing surface. In broad terms the inventive method of installation comprises the steps of:
 a) affixing a course of two-layer composite shingles to a portion of a roofing area; each two-layer composite shingle includes a posterior layer having a plurality of posterior tabs extending from an undivided headlap where the plurality of posterior tabs have cropped corners and an anterior layer having an anterior headlap which includes an alignment notch and at least one anterior tab;

b) affixing another course of the two-layer composite shingle to a remaining portion of the roof area and on a portion of a previously shingled portion having the two-layer composite shingles, where the cropped corners of the two-layer composite shingles of the other course align with the alignment notches of the two-layer composite shingles in the previously shingled portion of said roof; and c) repeating step b) N times until the roofing area is covered with the two-layer composite shingles.

A second embodiment of the present invention is a roof shingle comprising a shingle with at least one layer having a head lap and a butt, the head lap including at least one alignment notch and the butt including at least one corner that corresponds to the alignment notch. The roof shingle can have at least one alignment notch that can be cropped or can be formed by right, obtuse or acute angles to correspond to a side of the alignment notch. This embodiment can be for a single ply or multi-ply shingle.

A third embodiment of the present invention is a roofing shingle comprising at least one layer formed from a cutting cylinder having a circumference that is a fraction of said roofing shingle length. This embodiment can be for a single ply or multi-ply shingle.

The present invention also provides for a method for manufacturing the inventive shingles and a method for installing the inventive shingles upon a roofing area.

BRIEF DESCRIPTION OF THE DRAWINGS

FIG. 1(a) is a front elevational view depicting the anterior layer of FIG. 1.

FIG. 1(b) is a front elevational view depicting the posterior layer of FIG. 1.

DETAILED DESCRIPTION

Figure 1:
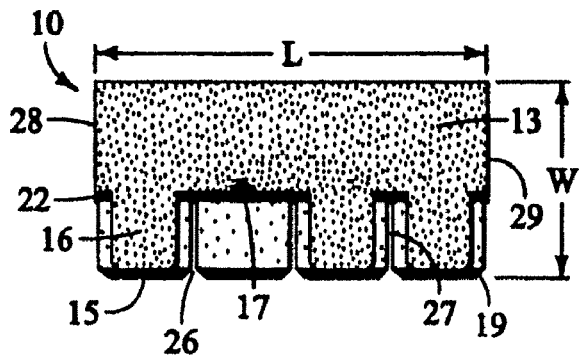
FIGS. 1-14, 23-25 are front elevational views depicting the various embodiments of the roofing shingle.
Figure 2:
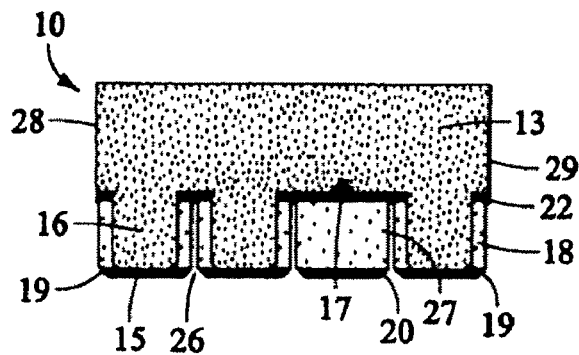
Figure 3:
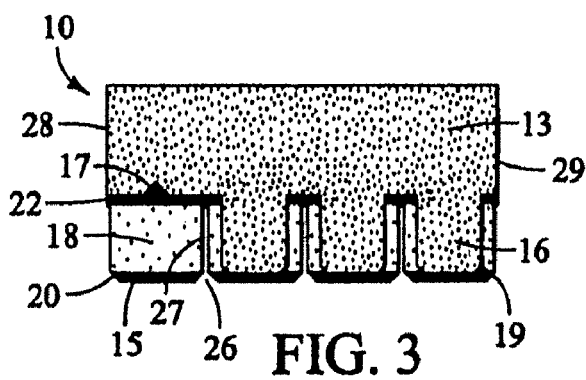
Figure 4:
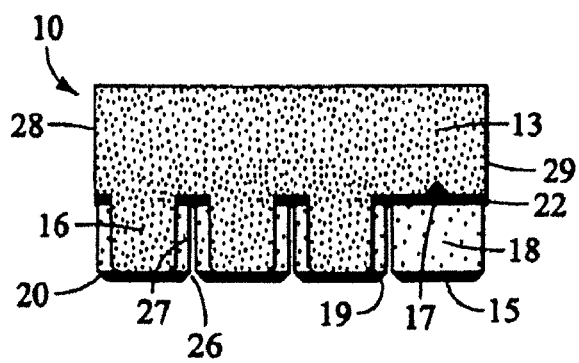
Figure 1:
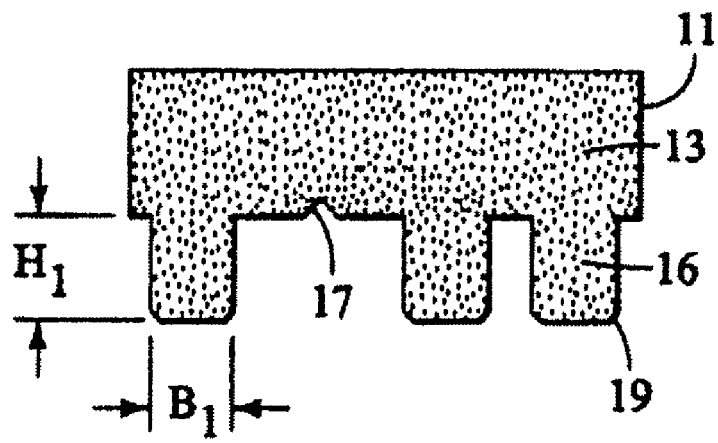
Figure 1:
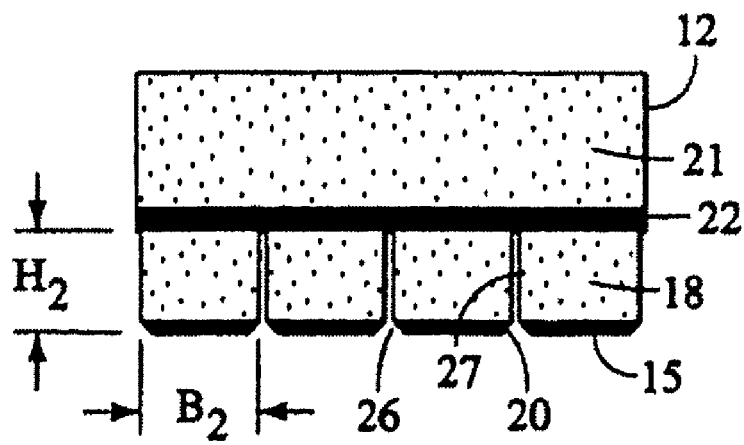
Figure 5:
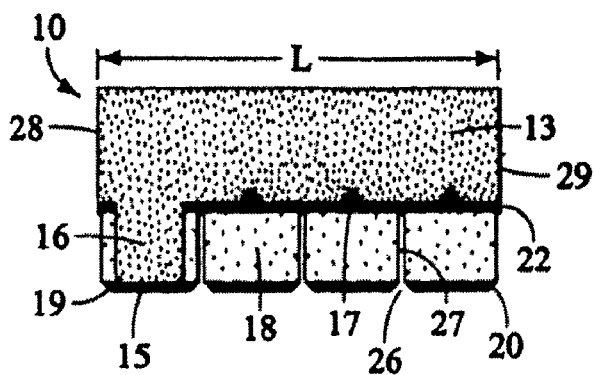
Figure 6:
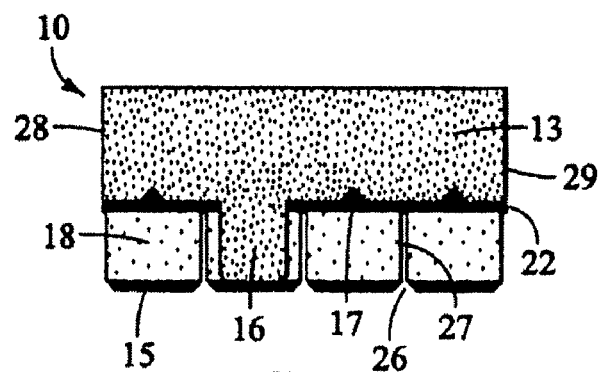
Figure 7:
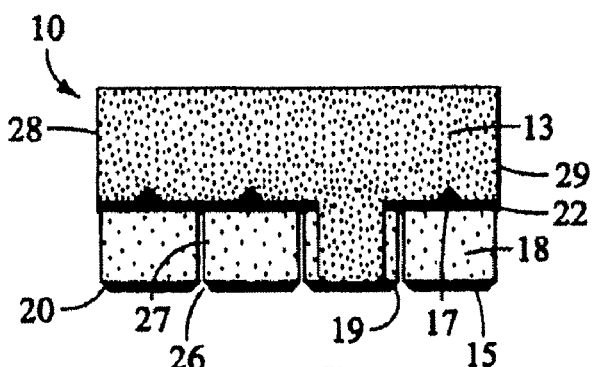
Figure 8:
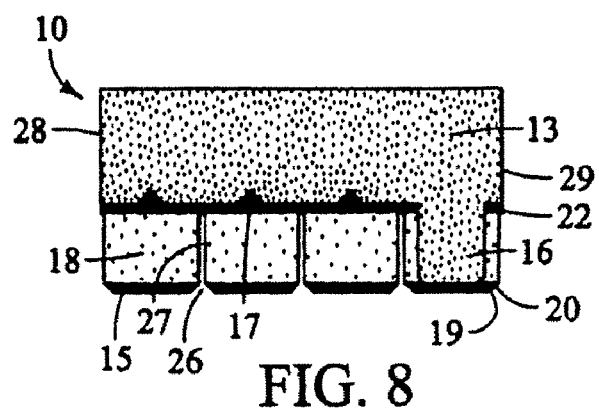
Figure 9:
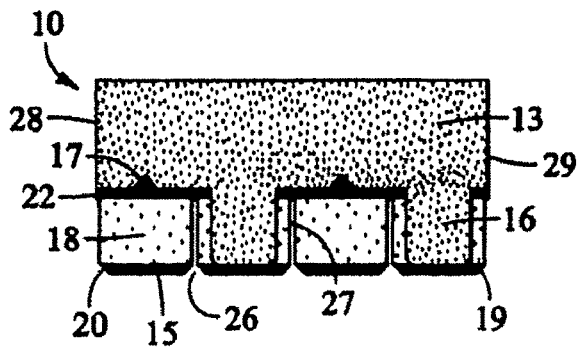
Figure 10:
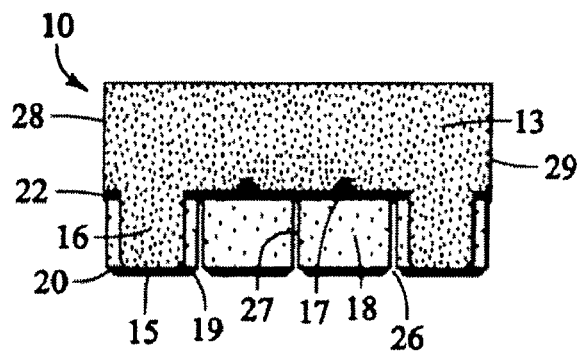
Figure 11:
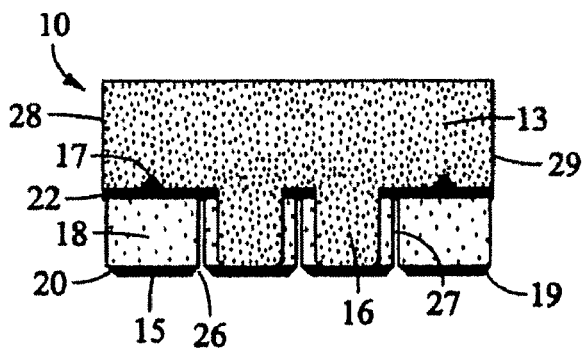
Figure 12:
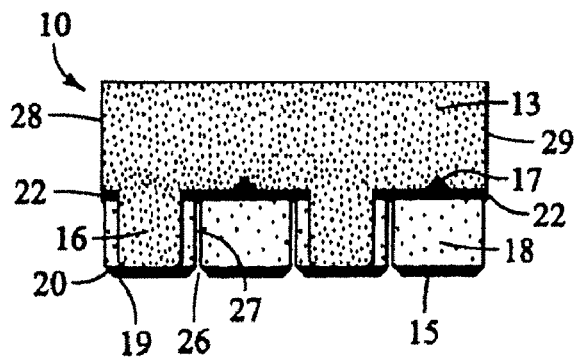
Figure 13:
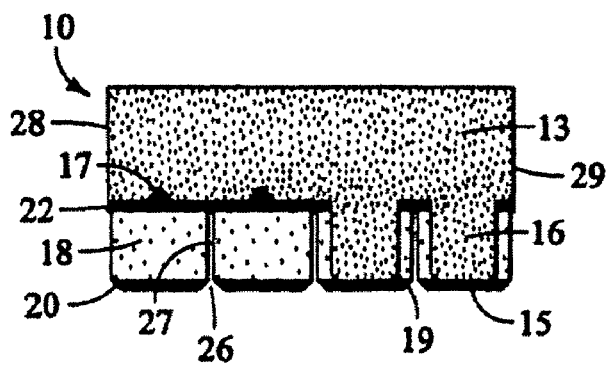
Figure 14:
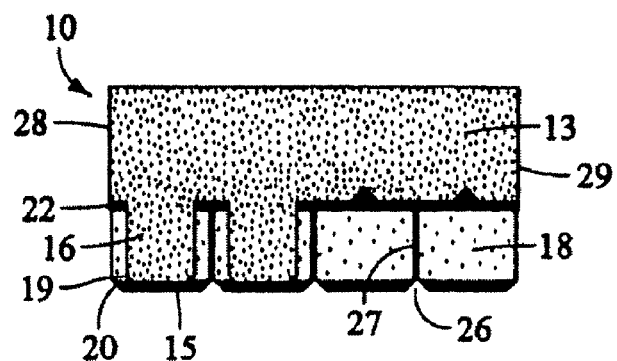

It is noted that in the accompanying drawings like and/or corresponding elements are referred to by like reference numerals. In addition, the different shadings of the individual layers in the drawings are not intended to signify a particular color value or intensity but only to indicate color contrasts between the layers and each individual layer may be lighter or darker than the shadings indicate, however a color contrast between the layers is optionally employed. It is further noted aspects of the invention are described in the "two layer embodiment" are but in no way limited to this embodiment and apply to each embodiment of the present invention.

The first embodiment of the present invention, which relates to two-layer composite roofing shingles having the appearance of a variable thickness, will now be described in greater detail by referring to the drawings that accompany the present application.

Reference is first made to FIGS. 1-14, illustrating front elevational views of the inventive two-layer composite shingle having an anterior layer 11 and a posterior layer 12, where the anterior layer 11 is positioned on the posterior layer 12. The anterior layer 11 and posterior layer 12 are each constructed from granular surface asphalt sheets. In a preferred embodiment, each shingle 10 has a length L of from about 30" to about 42" and a width W of from about 12" to about 19".

Referring to FIG. 1(a), the anterior layer 11 comprises an anterior headlap 13 and a butt that includes at least one anterior tab 16 extending from the anterior headlap 13. FIGS. 1-4 depict two-layer composite shingles having an anterior layer 11 that includes three anterior tabs 16. FIGS. 5-8 depict two-layer composite shingles having an anterior layer 11 that includes one anterior tab 16. FIGS. 9-14 depict a two-layer composite shingles having an anterior layer 11, which includes two anterior tabs 16.

The anterior tabs 16 are surfaced with weather resistant or colored granules. The butt edges of the anterior tabs 16 can be curved or straight and the anterior tab corners 19 can be cut or can be formed by right, obtuse or acute angles. In a preferred embodiment, the anterior tab corners 19 are cut as depicted in FIGS. 1-14.

Referring to FIG. 1(a), in another preferred embodiment, the breadth B1 of each anterior tab 16 may be approximately 40.0% to about 90.0% the breadth of the posterior tab and the height H1 of each anterior tab 16 may be approximately 4½" to approximately 8½" inches. Each anterior tab 16 is spaced to correspond to the underlying posterior layer 12. In yet another preferred embodiment, referring to FIGS. 1-4, adjacent anterior tabs 16, 11, 13, and 14, are separated by approximately ¼" to approximately 1".

The anterior headlap 13 is also surfaced with weather resistant or colored granules and may also include at least one alignment notch 17 positioned along the lower edge of the anterior headlap 13 in regions where anterior tabs 16 are not present. The anterior layer 11, which may include at least one alignment notch 17, may be formed by a cutting cylinder having a circumference that is a fraction of the two-layer composite shingle length. The notch 17 preferably extends into the anterior headlap 13 by approximately 1.0" to approximately 3.0". In a preferred embodiment, the alignment notch 17 may be formed using a shape that corresponds with the posterior tab corner 20 of the posterior tabs 18. The colored granules of the anterior headlap 13 may be the same shade as the anterior tabs 16.

Referring to FIG. 1(b), the posterior layer 12 comprises a plurality of posterior tabs 18 extending from the posterior headlap 21. In this embodiment, the posterior layer 12 comprises four posterior tabs 18. The posterior tabs 18 are preferably surfaced with a second shade of weather resistant or colored granules having a distinguishable hue or color from the first shade of the anterior tabs 16. The contrast in shade between the posterior tabs 18 and the anterior tabs 16 can be accentuated by varying the consistency of the weather resistant top coating, e.g. the density and/or size of granule deposition on either of these members. However, the shading of the colored granules are not a necessary element of the present invention and therefore any shading scheme is appropriate.

The space 27 separating adjacent posterior tabs 18 can be preferably between about 1¹⁄₁₆" and about 1.0" commensurate with the size of the posterior tabs 18 and the height and size of the roofing area. The breadth B2 of each posterior tab 18 preferably ranges from about 7½" to about 10¾", and is most preferably 9". The height H2 of each posterior tab 18 ranges preferably from about 6¾" to about 10¼", and is most preferably being 8½". In a preferred embodiment, the posterior tabs 18 are broader than overlying anterior tabs 16. Alternatively, a portion of the anterior tabs 16 may be broader than the underlying posterior tabs 18. As a further alternative, the posterior layer 12 may include an undivided butt end.

The butt edge of the posterior tabs 18 can be curved or straight and the tab corners 20 can be cropped or can be formed by right, obtuse or acute angles. In a preferred embodiment, the posterior tab corners 20 are cropped to correspond with the corners 19 of the overlying anterior tabs 16. The butt edge of the posterior tabs 18 may carry a shadow tip 15 which may be painted or imprinted horizontally across the tab bottom margin to provide a contrasting surface finish or texture. The shadow tip 15 may comprise granules having a third shade that contrasts with the shading of the anterior tabs 16 and posterior tabs 18.

The posterior headlap 21, which underlies the anterior headlap 13, is only partially exposed from the front view of the final shingle 10. The posterior headlap 21 may be surfaced with weather resistant or colored granules and may include a shadow band 22 at the interface between the posterior headlap 21 and the posterior tabs 18 to simulate shadowing or depth. The shadow band 22 may have a substantially unvaried width ranging from about 1½" to about 2½", preferably being 2". In another embodiment of the present invention, the width of the shadow band may be varied to provide a perception of irregularity. The shadow band 22 may also extend in the alignment notch 17 of the anterior headlap 13. The color of the shadow band 22 can be the same as that of the shadow tip 15 of the posterior tabs 18 or it can be a lighter or darker shade or hue; or the color of the shadow band 22 can be distinctly different to simulate bulk, highlight, shadow or any other aesthetic affect achievable by contrast with the exposed areas of the posterior layer 12.

The posterior layer 12 is secured to the anterior layer 11 forming a two-layer laminated or composite shingle 10. The anterior layer 11 is positioned where the anterior tabs 16 are positioned on the posterior tabs 18, preferably where the anterior tabs 16 are positioned substantially centered on the posterior tabs 18 though this centering is not necessary for the invention. The anterior layer 11 may alternatively be positioned where the anterior tabs 16 are positioned on the posterior tabs 18, where the anterior tabs 16 are offset from the posterior tabs 18. In a preferred embodiment, the posterior tabs 18 extend beyond the lower portion of the anterior tabs 16. In an even more preferred embodiment, the posterior tabs 18 extend approximately ¾ of an inch beyond the anterior tabs 16.

Figure 15:
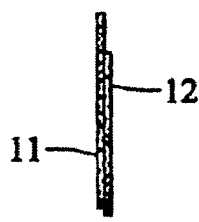
FIGS. 15-18 are side elevational views depicting the various embodiments of the roofing shingle.
Figure 16:
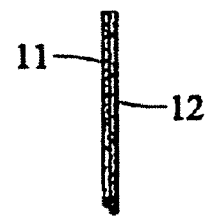
Figure 17:
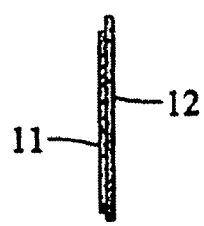
Figure 18:
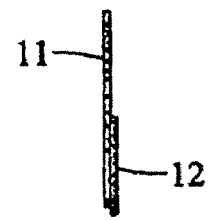
Figure 19:
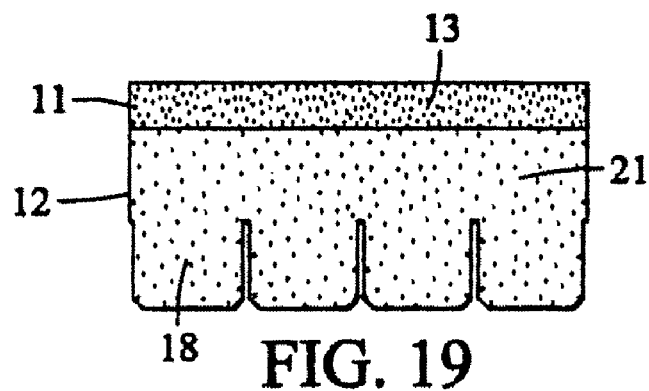
FIGS. 19-21 are back elevational views depicting the various embodiments of the roofing shingle.
Figure 20:
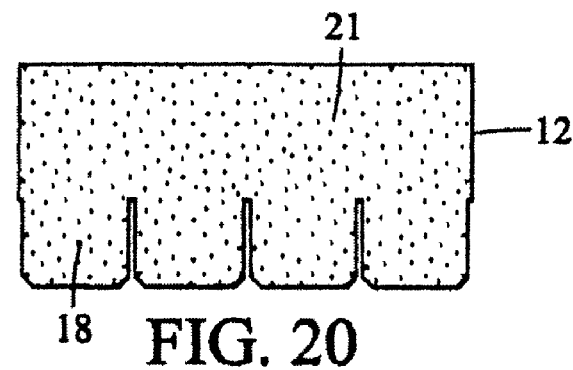
Figure 21:
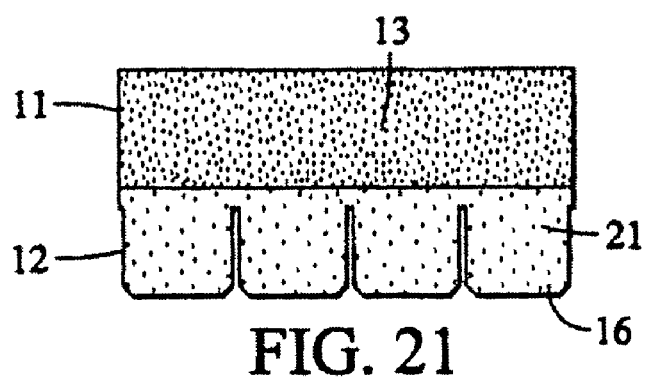

FIGS. 15-18, depict side views of the positioning of the anterior layer 11 on the posterior layer 12. Referring to FIG. 15, in a preferred embodiment of the present invention, the butt of the posterior tabs 18 extend beyond the anterior tabs 16 and the anterior headlap 13 extends beyond the posterior headlap 21; forming stepped edges at the head and butt of the two-layer composite shingle 10. Referring to FIG. 16, in another embodiment of the two-layer composite shingle 10 the edges of the headlap 13, 21 of the anterior layer 11 and posterior layer 12 are aligned to one another forming a composite shingle having a flush head edge and stepped butt edge. Referring to FIG. 17, in another embodiment of the present invention, the posterior tabs 18 and posterior headlap 21 of the posterior layer 12 extend beyond the overlying anterior layer 11. Referring to FIG. 18, in another embodiment of the two-layer composite shingle 10 a posterior layer 12 having a shorter height is employed, where a greater portion of the anterior headlap 13 extends beyond the underlying posterior layer 12.

Manufacturing of the inventive shingle embodiments is described with reference to the two-layer composite shingle. However, the two-layer composite is used only as an example and the method of manufacturing is not limited to this embodiment.

Manufacturing the two-layer composite shingle begins with applying granules to asphalt sheeting, where the granules can be blended to produce the desired shading and then applied to the surface of the asphalt sheet. The granule laden asphalt sheet is then pressed in a press roll unit, such that the granules embed in the asphalt coating. The asphalt sheet is then cut to the desired shape. The cutting process first measures out 1 shingle length of material and then feeds the measured amount into the cutting module. The cutting module preferably includes a rotary cutting cylinder with hardened steel tooling. The anterior layer 11 pattern is cut using a fractional cutting cylinder, where the fractional cutting cylinder produces a pattern that is a fraction of the shingle length. This provides a substantially repeating pattern.

For example, if a fractional cutting cylinder circumference is 75% the length of a single shingle and that cutting cylinder includes a pattern, that pattern will be repeated every forth shingle produced after the fifth rotation of the cutting cylinder. In a preferred embodiment the pattern extends across the entire cutting cylinder. The pattern may further include an alignment notch 17. By utilizing a fractional cutting cylinder circumference, the maximum amount of patterns for the minimum amount of diameter can be produced. The preferred cylinder circumference is between 1.25 and 1.75 greater than the length of a single shingle. In a most preferred embodiment, one and a half of the cylinder pattern is used to cut each anterior layer 11 for each shingle 10. The posterior layer 12 is preferably cut using a non-fractional cylinder pattern.

Following cutting, the posterior layer 12 and anterior layer 11 are joined. In broad terms, preferably, an adhesive is applied to the posterior layer 12 and/or anterior layer 11, where following the application of the adhesive, the posterior layer 12 and anterior layer 11 are pressed together. The pressed posterior layer 12 and anterior layer 11 are then cut to a predetermined shingle length.

The inventive shingles are installed in overlapping courses. Installation of the inventive shingles are further described by reference to the two-layer composite embodiment as an example only. The inventive shingle installed may have an anterior layer 11, having an alignment notch 17, formed from a cutting cylinder having a circumference that is a fraction of the two-layer composite shingle length. Upon installation of each course, the rear edge 29 of one shingle 10 is positioned in abutment with the leading edge 28 of the successive shingle. The courses overlap where the butt of a second course of shingles cover the headlap 13 of the preceding course of shingles, where the posterior tabs 18 of the singles of the second course are offset from those of the preceding course.

In a preferred embodiment, the posterior tabs 18 of each shingle are of equal height and are formed having cut right angled corners 20, where the corners of each adjacent posterior tab 18 form a triangular edge 26 having an apex aligned with the space 27 separating adjacent posterior tabs 18. During installation the triangular edge 26 of the shingles in the second course correspond to the alignment notch 17 in the anterior headlap 13 of the shingles in the underlying preceding course.

In another embodiment, the posterior layer of each shingle has corners that form a substantially right angle. This right angle corresponds to a substantially square alignment notch of the anterior head lap of a shingle. During installation, the square alignment notch of a shingle aligns with the 90-degree edges of the corner of the posterior layer of the former shingle. The invention does not rely on the shape of the alignment notch and posterior corners. The corresponding shapes of each alignment notch and corner provide for the efficient installation of each preceding shingle.

Figure 22:
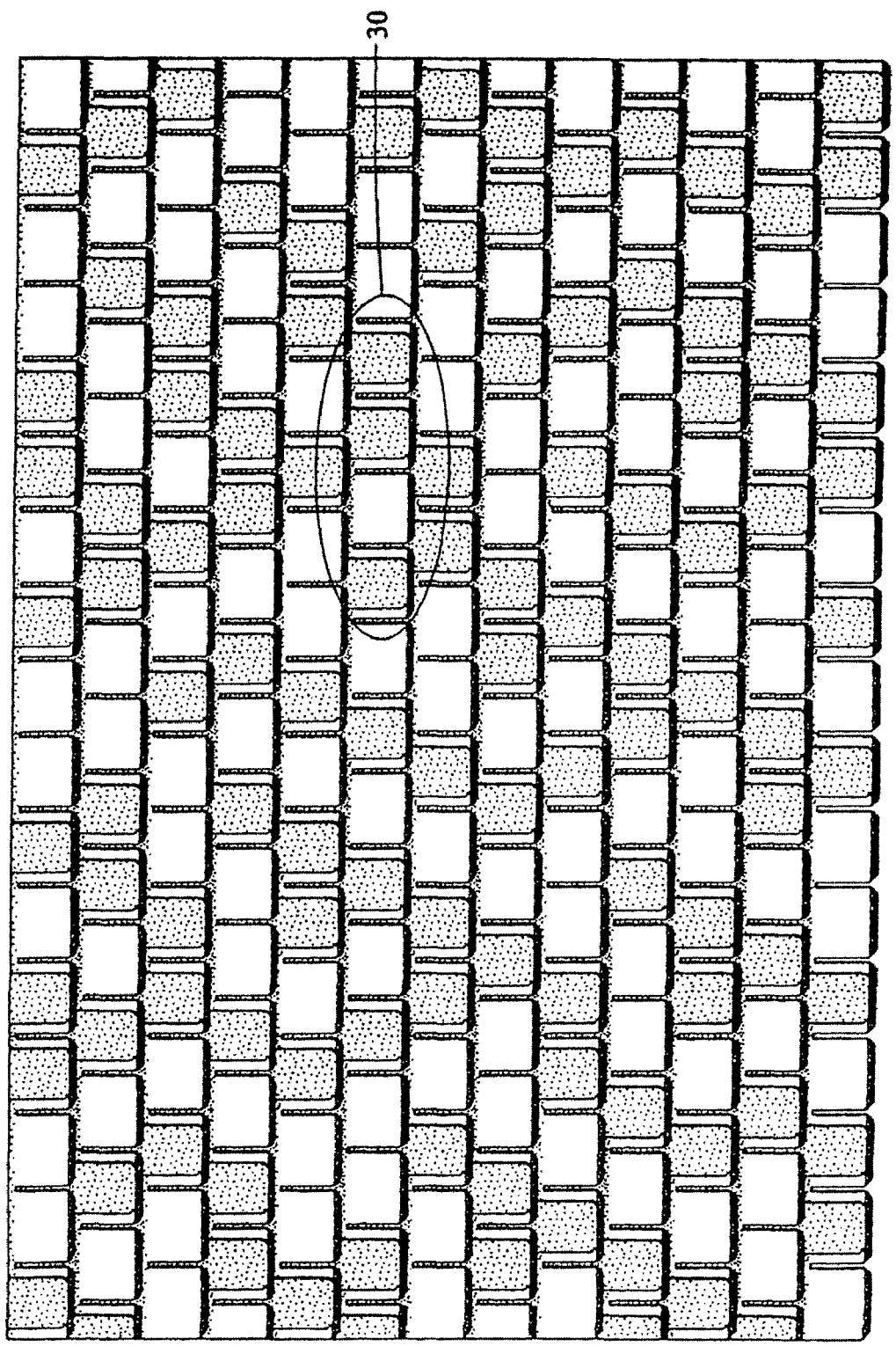
FIG. 22 depicts a plurality of the inventive two-layer composite embodiment installed on a roofing area.

Additionally, the shadow band 22 of the posterior layer 12 of the shingles in the preceding course align with the shadow tip 15 at the end of the posterior tabs 18 of the singles in the second course to give the appearance of the depth present in bulkier roofing. FIG. 22 depicts the two-layer composite shingle 30 installed upon a portion of a roof.

A second embodiment of the present invention comprises a roof shingle with at least one layer having a head lap and a butt, the head lap including at least one alignment notch and the butt including at least one corner that corresponds to the alignment notch. The butt edge can be curved or straight and the corners can be cropped or can be formed by right, obtuse or acute angles to correspond to the alignment notch.

Figure 23:
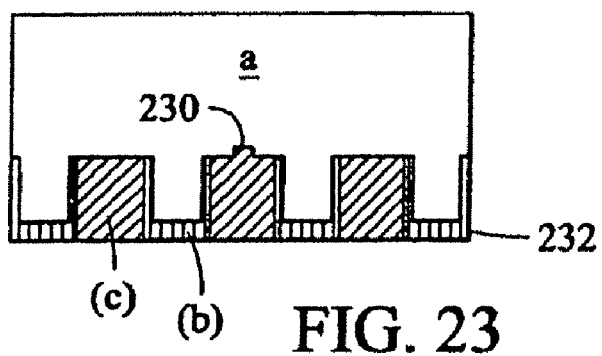
Figure 24:
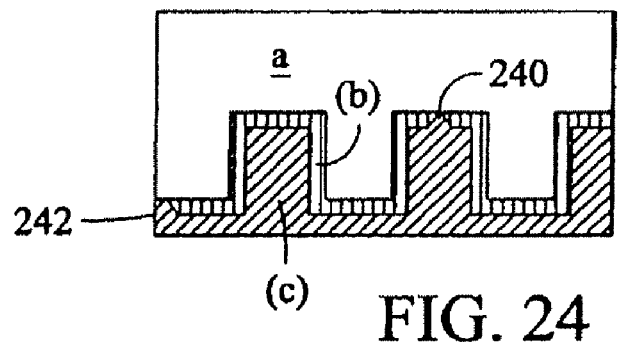
Figure 25:
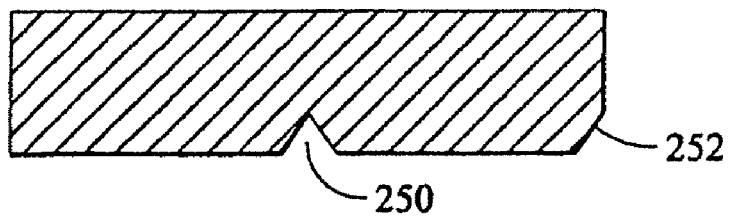

The roof shingle can be a single ply or multi-ply shingle. For example, a three ply shingle as shown in FIG. 23 can comprise an anterior layer "a", a middle layer "b", and a posterior layer "c". The anterior layer includes at least one alignment notch 230, in this case a square notch, and the posterior layer includes at least one corner corresponding to the alignment notch. As shown in FIG. 24, the middle layer can also comprise at least one alignment notch 240 and/or at least one corner corresponding to an alignment notch 242. Other multi-ply shingles can be similarly comprised where any or all of the middle layers can comprise at least one alignment notch and/or corner corresponding to an alignment notch. The anterior layers of these multi-ply shingles can include at least one alignment notch while the posterior layers can include at least one corresponding corner. An example of a single ply embodiment is shown in FIG. 25 exhibiting an alignment notch 250 and a cropped corner that corresponds to such notch 252.

A third embodiment of the present invention comprises at least one layer formed from a cutting cylinder having a circumference that is a fraction of said roofing shingle length. This shingle can be single or multi-ply. An example of this embodiment for a two-ply laminate is shown in detail above. By further example, a three layer shingle can comprise an anterior layer, a middle layer, and a posterior layer. The anterior and or a middle layer can be formed from said cutting cylinder having a circumference that is a fraction of its length. A two-layer shingle can comprise a posterior layer and an anterior layer formed from a cutting cylinder having a circumference that is a fraction of said two layer composite roofing shingle length positioned on said posterior layer.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the spirit and scope of the appended claims.

What is claimed is:

1. A roofing material comprising four adjacent shingles, each of the first, second, third and fourth adjacent shingles comprising:

(a) a posterior layer having a posterior headlap and four posterior tabs extending therefrom, each posterior tab having a posterior tab corner;

(b) an anterior layer having an anterior headlap, one or more anterior tabs extending from said headlap, and at least one alignment notch positioned on a lower edge of the anterior headlap proximate the posterior tabs, wherein the total number of anterior tabs and notches on the anterior layer is equal to the total number of posterior tabs; and wherein the anterior layer is positioned on the posterior layer in a manner such that each anterior tab is positioned substantially over the center of one of the respective four posterior tabs; and wherein, for each posterior tab having no anterior tab positioned thereon, the at least one alignment notch is positioned along the lower edge of the anterior headlap in substantially the center of the region where the anterior headlap lies over the posterior tab;

wherein the posterior tab corner forms an edge having substantially the same angle as an edge of the alignment notch;

wherein each of the first, second and third adjacent shingles differ from each other based on the position of at least one anterior tab with its respective posterior tab; and wherein the first adjacent shingle and the fourth adjacent shingle are identical based on the positions of the one or more anterior tabs and the at least one alignment notch, so that when installed, a pattern of varying anterior tabs is created based on the location of the anterior tabs and the at least one notch.

2. The roofing material of claim 1, wherein the anterior headlap of each shingle comprises one anterior tab extending therefrom, and two alignment notches positioned on the lower edge of the anterior headlap.

3. The roofing material of claim 1, wherein the anterior headlap of each shingle comprises two anterior tabs extending therefrom, and two alignment notches positioned on the lower edge of the anterior headlap.

4. The roofing material of claim 1, wherein the anterior headlap of each shingle comprises three anterior tabs extending therefrom, and one alignment notch positioned on the lower edge of the anterior headlap.

5. The roofing material of claim 1, wherein:
the at least one anterior tab further comprises granules having a first shade and said plurality of posterior tabs further comprise granules of a second shade;
the posterior layer further comprises a shadow band positioned at an interface between the posterior tabs and the posterior headlap;
the posterior tabs further comprise a shadow tip positioned on a lower edge of the posterior tabs;
the shadow tip and shadow band include granules having a third shade that is darker than said first shade of the at least one anterior tab and the second shade of the posterior tabs.

6. The roofing material of claim 1 wherein the at least one anterior tab has a first breadth and the posterior tabs have a second breadth, and wherein the second breadth is greater than the first breadth.

7. The roofing material of claim 1 wherein the posterior tabs are separated by about 1.0 inch or less.

* * * * *